US007081299B2

(12) United States Patent
Richeson

(10) Patent No.: US 7,081,299 B2
(45) Date of Patent: Jul. 25, 2006

(54) POLYPROPYLENE FIBERS AND FABRICS

(75) Inventor: Galen Charles Richeson, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/344,978

(22) PCT Filed: Aug. 22, 2001

(86) PCT No.: PCT/US01/26198

§ 371 (c)(1),
(2), (4) Date: Jul. 2, 2003

(87) PCT Pub. No.: WO02/16681

PCT Pub. Date: Feb. 28, 2002

(65) Prior Publication Data
US 2004/0028903 A1 Feb. 12, 2004

Related U.S. Application Data

(60) Provisional application No. 60/263,368, filed on Jan. 23, 2001, provisional application No. 60/227,101, filed on Aug. 22, 2000.

(51) Int. Cl.
B32B 27/00 (2006.01)

(52) U.S. Cl. ............... 428/394; 428/395; 442/189; 442/301

(58) Field of Classification Search ............... 428/394, 428/395; 442/189, 301; 156/167
See application file for complete search history.

(56) References Cited

U.S. PATENT DOCUMENTS

| 3,849,241 | A | 11/1974 | Butin et al. ............... 161/169 |
| 4,340,563 | A | 7/1982 | Appel et al. ............... 264/518 |
| 4,384,095 | A | 5/1983 | Reed et al. ............... 526/293 |
| 4,384,098 | A | 5/1983 | Hagler et al. ............... 526/348 |
| 4,430,852 | A | 2/1984 | Hatcher ............... 57/247 |
| 4,451,589 | A | 5/1984 | Morman et al. ............... 523/124 |
| 4,644,045 | A | 2/1987 | Fowells ............... 526/348 |
| 4,797,318 | A | 1/1989 | Brooker et al. ............... 428/283 |
| 4,818,597 | A | 4/1989 | DaPonte et al. ............... 428/284 |
| 4,830,987 | A | 5/1989 | Miller et al. ............... 437/247 |
| 5,026,798 | A | 6/1991 | Canich ............... 526/127 |
| 5,078,935 | A | 1/1992 | Kobayashi et al. ............... 264/103 |
| 5,188,885 | A | 2/1993 | Timmons et al. ............... 428/198 |
| 5,213,881 | A | 5/1993 | Timmons et al. ............... 428/224 |
| 5,240,894 | A | 8/1993 | Burkhardt et al. ............... 502/108 |
| 5,271,883 | A | 12/1993 | Timmons et al. ............... 264/6 |
| 5,583,076 | A | * | 12/1996 | Yoshizawa et al. ............... 438/64 |
| 5,637,666 | A | 6/1997 | Winter et al. ............... 526/351 |
| 5,643,847 | A | 7/1997 | Walzer ............... 502/117 |
| 5,723,217 | A | 3/1998 | Stahl et al. ............... 428/401 |
| 5,726,103 | A | 3/1998 | Stahl et al. ............... 442/59 |
| 5,736,465 | A | 4/1998 | Stahl et al. ............... 428/298 |
| 5,763,080 | A | 6/1998 | Stahl et al. ............... 428/378 |
| 5,891,814 | A | 4/1999 | Richeson et al. ............... 422/401 |
| 5,972,823 | A | 10/1999 | Walzer ............... 502/152 |
| 5,994,482 | A | 11/1999 | Georgellis et al. ............... 526/65 |
| 6,010,588 | A | 1/2000 | Stahl et al. ............... 156/167 |
| 6,143,686 | A | 11/2000 | Vizzini et al. ............... 502/152 |
| 6,143,911 | A | 11/2000 | Fujita et al. ............... 556/11 |

(Continued)

FOREIGN PATENT DOCUMENTS

| EP | 0 628 574 | 12/1994 |
| EP | 0 513 380 | 10/1997 |
| EP | 0 905 290 | 3/1999 |
| WO | 94/28219 | 12/1994 |
| WO | 98/23799 | 6/1998 |
| WO | 99/19547 | 4/1999 |
| WO | 99/58587 | 11/1999 |
| WO | 00/12565 | 3/2000 |

OTHER PUBLICATIONS

Yang et al. "Cation-like" Homogeneous Olefin Polymerization Catalysts Based upon Zirconocene Alkyls and Tris(pentafluorophenyl)borane, J. Am. Chem.Soc., 1991, 113, pp. 3623-3625.

Chien et al., Isospecific Polymerization of Propylene Catalyzed by rac-Ethylenebis(indenyl)methylzirconium "Cation", J. Am. Chem. Soc., 1991, 113, pp. 8570-8571.

Yang et al., "Cationic Zirconocene Olefin Polymerization Catalysts Based on the Organo-Lewis Acid Tris(pentafluorophenyl)borane. A Synthetic, Structural, Solutuion Dynamic, and Polymerization Catalytic Study", J. Am. Chem. Soc., 1994, 116, pp. 10015-10031.

Herfert et al., "Ethylene and Propene Polymerization with the Catalyst System $Me_2Si[Ind]_2ZrMe_2/[Bu_3NH][B(C_6F_5)_4]$: a kinetic study", Makromol. Chem. Rapid Commun. (1993) 14, pp. 91-96.

Bochmann et al., "Base-Free Cationic Zirconium Benzyl Complexes as Highly Active Polymerization Catalysts", Organometallics, 1993, 12, pp. 663-640.

Lin et al., "Assessment of Metallocene Propylene Polymers for Cast Film Applications", ANTEC 2000, May 7-11, 2000, Orlando, Florida, Conference Proceedings, Vol. 1 ~ Processing.

Primary Examiner—Jill Gray
(74) Attorney, Agent, or Firm—Kevin M. Faulkner

(57) ABSTRACT

The present invention is a meltblown fiber and a fabric manufactured from the fiber comprising reactor grade polypropylene having a melt flow rate of from 100 to 5000 and having less than 50 stereo defects per 1000 units. Further, the polypropylene is typically produced from a metallocene catalyzed process, the metallocene being at least one bridged 2,4 di-substituted indenyl metallocene in one embodiment, and a bridged 4-phenyl indenyl metallocene in another embodiment. The metallocene is part of a system that can include a fluorided support and a non-coordinating anion activator.

42 Claims, No Drawings

U.S. PATENT DOCUMENTS

| | | |
|---|---|---|
| 6,207,600 B1 | 3/2001 | Nakajima et al. ............ 442/311 |
| 6,235,664 B1 | 5/2001 | Georgellis et al. ........... 442/382 |
| 6,467,172 B1 * | 10/2002 | Jenq .............................. 30/92 |
| 6,639,020 B1 * | 10/2003 | Brant ........................... 525/240 |
| 2003/0130422 A1 * | 7/2003 | Brant ........................... 525/89 |
| 2004/0028903 A1 * | 2/2004 | Richeson .................... 428/401 |
| 2004/0034170 A1 * | 2/2004 | Brant ........................... 525/240 |
| 2004/0038022 A1 * | 2/2004 | Maugans et al. ............ 428/328 |

* cited by examiner

POLYPROPYLENE FIBERS AND FABRICS

CROSS REFERENCE TO RELATED APPLICATIONS

This application claims the benefit of Provisional application Nos. 60/227,101, filed Aug. 22, 2000, and 60/263,368, filed Jan. 23, 2001, herein incorporated by reference in their entireties.

FIELD OF THE INVENTION

The present invention relates to polypropylene fibers and fabrics produced from a supported metallocene catalyzed process.

BACKGROUND OF THE INVENTION

A meltblown fiber and fabric is typically made in a one-step process in which high-velocity air blows a molten thermoplastic resin from an extruder die tip onto a conveyor or takeup screen to form a fine fibered self-bonding web. Although many types of polymers can be used meltblown fibers and fabrics, polypropylene is one of the most commonly used polymers. In one meltblown process, the polypropylene is fed as granules or pellets into an extruder where it can be mixed with additives in a masterbatch. Additives include stabilizers, peroxides, dyes, and other chemical agents.

In one type of meltblown process, metering pumps are used to pump the molten polypropylene to a distribution system having a series of die tips, the polypropylene being in the molten state at some processing temperature. The die tip is designed in such a way that the holes are in a straight line with high-velocity air impinging from each side. A typical die will have 0.38 mm diameter holes spaced at 10 to 16 per cm (25–40 per inch). The impinging high-velocity hot air attenuates the filaments and forms the desired fibers, or microfibers. Immediately below or adjacent to the die, a large amount of ambient air is drawn into the hot air stream containing the microfibers which cools the hot gas and solidifies the microfibers onto a forming belt or other solid surface that is typically moving in such a manner as to create a continually renewed surface for the microfibers to contact and form a fabric or web (hereinafter "fabric"). The processing temperature is one factor in the final fabric properties. The "optimal" processing temperature is one at which ideal properties of the fabric are achieved such as low shot with good hand and high barrier properties, or good filtration properties.

Fabric quality is controlled by many factors such as the uniformity of the fiber distribution in the air stream and adjustment of other manufacturing variables such as processing temperature. Another factor controlling fabric quality are the properties of the polypropylene. Several defects can result from a poor selection of polymer physical properties such as roping, fly, and shot. Shot are pinpoint-sized polypropylene beads in the fabric that affect porosity, uniformity, and hand (texture) of the fabric, and are a principle cause of off-quality fabric. More particularly, too broad a molecular weight distribution, and/or slow crystallization of the polymer can cause shot.

The presence of shot decreases the hydrohead of the fabric, which is a measure of the porosity (liquid barrier resistance) of the fabric. This is undesirable in many of the desired applications of polypropylene fabrics such as surgical barriers and protective wear for medical personnel, where there is a need to prevent fluid-borne pathogens from directly contacting the medical personnel, and is undesirable in filtration devices as well. Polypropylene produced by Ziegler-Natta catalyzed processes have been used to produce fibers and fabric, but have the drawback of requiring the use of peroxides as a pre-treatment to forming the fibers and fabric. The addition of peroxides increases the complexity and expense of making the fibers, such as by adding more variability to the process of manufacturing the fibers and fabrics, and is hence undesirable.

Polypropylene produced by metallocene catalyzed processes have also been used to make fibers and fabric, such as disclosed by Stahl et al. in U.S. Pat. Nos. 5,723,217; 5,726,103; 5,736,465; 5,763,080; and 6,010,588, which describe a benzo-substituted indenyl metallocene using an alkylalumoxanes as an activator. Richeson et al. in U.S. Pat. No. 5,891,814, disclose a dual metallocene-generated propylene used to make spunbond fibers, also using an alkylalumoxanes activator. Also, WO 99/19547 discloses a method for producing spunbonded fibers and fabric derived from a blend of propylene homopolymer and a copolymer of polypropylene. While these metallocene catalyzed polypropylenes are reactor grade (not treated with peroxides), shot is still at an unacceptable level in these polypropylenes.

What is needed is a meltblown fabric that has low shot levels, and maintains a high hydrohead and soft hand. Also, fabrics with low shot levels useful for articles such as filtration devices and barriers.

SUMMARY OF THE INVENTION

The present invention solves these and other problems by providing a polypropylene that has improved characteristics suitable for forming meltblown fibers, fabric and laminates having a lower shot level (amount of shot per unit area) while maintaining or improving hydrohead and air permeability for good filtration properties. The polypropylene fibers and fabrics of the present invention have improved properties that create a grade of fibers and fabric that can be used in diapers, surgical drapes, surgical gowns and other surgical wear, filters, and other hygiene products, to name a few.

The present invention is a fiber and a fabric manufactured from the fiber comprising reactor grade polypropylene having a melt flow rate (MFR) of from 100 to 5000 dg/min in one embodiment, and having less than 50 stereo defects per 1000 units. The higher tacticity (greater MRL) of the inventive polymer results in shorter half-times of crystallization under quiescent conditions. The inherently faster crystallization rate is believed to shorten crystallization times during meltblown processing, leading to reduced shot. In one embodiment, the crystallization half time for the resins of the invention are from 2.5 to 6.5 min, and from 2.8 to 5 in another embodiment, and from 3 to 4.5 min in yet another embodiment at 125° C. The polypropylene typically has a MWD in the range from 1 to 5 in one embodiment, and from 2 to 4 in another embodiment, and from 2 to 3 in yet another embodiment. The polypropylene is a homopolymer in a desirable embodiment.

The polypropylene resin of the invention is produced from a catalyst system comprising at least one silica supported metallocene and at least one non-coordinating anion activator (NCA activator). In one embodiment, the metallocene used is a bridged 2,4 di-substituted indenyl metallocene, and in another embodiment the metallocene is a bridged 4-phenyl indenyl metallocene. Polymers of the present invention crystallize at a faster rate as shown by half-time values than comparative metallocene resins, and do not require peroxide or excessive temperatures to produce the relatively narrow MWD required for improved fiber production, and allows production of resins at a higher MFR, thus contributing to the improved properties of the fibers and fabrics of the invention.

DETAILED DESCRIPTION OF THE INVENTION

Embodiments of the present invention encompass fibers, fabrics and laminates produced from polypropylene, and propylene homopolymers in a desirable embodiment, having unexpected properties defined by being synthesized from a certain class of metallocene catalyst system. The resultant polypropylene has a relatively narrow MWD and higher isotacticity and hence faster crystallization times. The fabric thus produced has improved characteristics such as low shot and high hydrohead properties. The description and examples below describe the invention in greater detail.

Although the following materials discuss preferred supported metallocene catalyst systems in great detail, it should be appreciated that the catalyst system can be any number of embodiments of the inventive supported metallocene catalyst system described herein, and the invention is not limited to the preferred systems described herein.

Preferably, the metallocene catalyst system is the product of contacting at least three components: (1) one or more metallocenes; (2) one or more activators; and (3) one or more fluorided support compositions.

Definitions

The term "reactor grade" refers to polyolefin resin whose molecular weight distribution (MWD), or polydispersity, has not been substantially altered after polymerization. The term particularly includes polyolefins which, after polymerization, have not been treated, or subjected to treatment, to substantially reduce viscosity or substantially reduce average molecular weight.

Preferably, the metallocene catalyst system of the present invention is the product of contacting at least three components: (1) one or more metallocenes; (2) one or more activators; and (3) one or more fluorided support compositions.

As used herein, "meltblown fibers" and "meltblown fabrics" refers to fibers formed by extruding a molten thermoplastic material at a certain processing temperature through a plurality of fine, usually circular, die capillaries as molten threads or filaments into converging high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. No. 3,849,241. Meltblown fibers are microfibers that are either continuous or discontinuous and are generally smaller than 10 microns, preferably less than 5 microns, typically 1 to 3 microns in average diameter.

As used herein, the terms "multilayer laminate", "laminate", and "composite" refer to a layered structure wherein some of the layers may be spunbond fabric and some may be meltblown fabric such as, for example, spunbond/meltblown/spunbond ("SMS") laminate and others disclosed in, or other substrates such as films, netting, or other synthetic or natural material such as disclosed in, for example, U.S. Pat. Nos. 4,041,203; 5,169,706; 5,145,727; 5,178,931 and 5,188,885. Such laminates or composites may also contain multiple layers of spunbond and meltblown fabrics in various concentrations such as SMS, SSMMSS, etc.

As used herein, the term "polypropylene" refers to homopolymers or copolymers made from propylene derived units, and $C_3$ to $C_{12}$ α-olefin derived units when a copolymer.

As used herein, the phrase "fluorided support" or "fluorided support composition" means a support, desirably particulate and porous, which has been contacted with at least one inorganic fluorine containing compound. For example, the fluorided support composition can be a silicon dioxide support wherein a portion of the silica hydroxyl groups has been replaced with fluorine or fluorine containing compounds.

As used herein, the numbering scheme for the Periodic Table Groups are used as in HAWLEY'S CONDENSED CHEMICAL DICTIONARY 852 (13th ed. 1997).

As used herein, the terms "catalyst system" and "metallocene catalyst system" include at least one or more metallocenes, and at least one secondary component such as activators and cocatalysts, of which alumoxanes and boranes are broad classes of such compounds, and at least one support such as a silica support which may be fluorided which may also be present.

Metallocene Component

The catalyst system of the present invention has as a component at least one metallocene. As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium (Ti), zirconium (Zr), hafnium (Hf), vanadium (V), niobium (Nb), tantalum (Ta), chromium (Cr), molybdenum (Mo) and tungsten (W), R is a hydrocarbyl group or hydrocarboxy group having from one to 20 carbon atoms, X is a halogen or hydrogen, and m=1–3, n=0–3, q=0–3, and the sum of m+n+q is equal to the oxidation state of the transition metal.

Methods for making and using metallocenes are disclosed in, for example U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723, 6,143,686; and 5,391,790.

One embodiment of the metallocenes used in the catalyst system of the invention are represented by the structure (1):

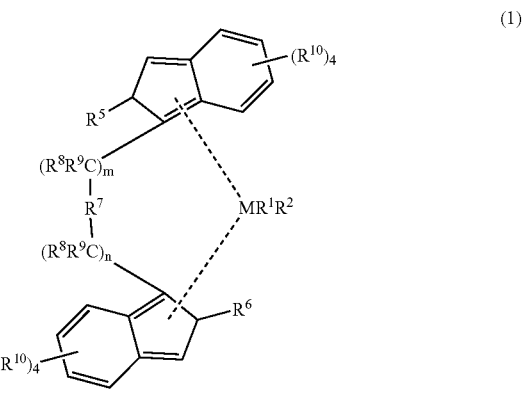

(1)

wherein M is a metal of Group 4, 5, or 6 of the Periodic Table, zirconium (Zr), hafnium (Hf) or titanium (Ti) in one embodiment.

In structure (1), $R^1$ and $R^2$ are identical or different, and are one of a hydrogen atom, a $C_1$–$C_{10}$ alkyl group, a $C_1$–$C_3$ alkyl group in another embodiment, a $C_1$–$C_{10}$ alkoxy group, a $C_1$–$C_3$ alkoxy group in another embodiment, a $C_6$–$C_{10}$ aryl group, a $C_6$–$C_8$ aryl group in another embodiment, a $C_6$–$C_{10}$ aryloxy group, a $C_6$–$C_8$ aryloxy group in another embodiment, a $C_2$–$C_{10}$ alkenyl group, a $C_2$–$C_4$ alkenyl group in another embodiment, a $C_7$–$C_{40}$ arylalkyl group, a $C_7$–$C_{10}$ arylalkyl group in another embodiment, a $C_7$–$C_{40}$ alkylaryl group, a $C_7$–$C_{12}$ alkylaryl group in another embodiment, a $C_8$–$C_{40}$ arylalkenyl group, a $C_8$–$C_{12}$ arylalkenyl group in another embodiment, or a halogen atom, preferably chlorine. In another embodiment, $R_1$ and $R_2$ can be an alkyl diene or other diene compound that is able to provide two points of unsaturation for association with the metal center M of (1).

In structure (1), $R^5$ and $R^6$, being in the so called "2" position on the indenyl ring, are identical or different and are one of a halogen atom, a fluorine, chlorine or bromine atom in one embodiment, a $C_1$–$C_{10}$ alkyl group, a $C_1$–$C_4$ alkyl group in another embodiment, which may be halogenated, a $C_6$–$C_{10}$ aryl group, which may be halogenated, a $C_6$–$C_8$ aryl group in another embodiment, a $C_2$–$C_{10}$ alkenyl group, a $C_2$–$C_4$ alkenyl group in another embodiment, a $C_7$–$C_{40}$ arylalkyl group, a $C_7$–$C_{10}$ arylalkyl group in another embodiment, a $C_7$–$C_{40}$ alkylaryl group, a $C_7$–$C_{12}$ alkylaryl group in another embodiment, a $C_8$–$C_{40}$ arylalkenyl group, a $C_8$–$C_{12}$ arylalkenyl group in another embodiment, a —$NR_2^{15}$, —$SR^{15}$, —$OR^{15}$, —$OSiR_3^{15}$ or —$PR_2^{15}$ radical, wherein $R^{15}$ is one of a halogen atom, a chlorine atom in another embodiment, a $C_1$–$C_{10}$ alkyl group, a $C_1$–$C_3$ alkyl group in another embodiment, or a $C_6$–$C_{10}$ aryl group, a $C_6$–$C_9$ aryl group in another embodiment.

Also, in structure (1), $R^7$ is

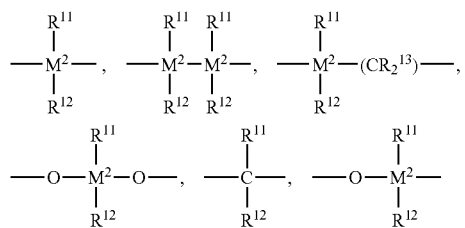

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—, wherein $R^{11}$, $R^{12}$ and $R^{13}$ are identical or different and are a hydrogen atom, a halogen atom, a $C_1$–$C_{20}$ alkyl group, a $C_1$–$C_{10}$ alkyl group in another embodiment, a $C_1$–$C_{20}$ fluoroalkyl group, a $C_1$–$C_{10}$ fluoroalkyl group in another embodiment, a $C_6$–$C_{30}$ aryl group, a $C_6$–$C_{20}$ aryl group in another embodiment, a $C_6$–$C_{30}$ fluoroaryl group, a $C_6$–$C_{20}$ fluoroaryl group in another embodiment, a $C_1$–$C_{20}$ alkoxy group, a $C_1$–$C_{10}$ alkoxy group in another embodiment, a $C_2$–$C_{20}$ alkenyl group, a $C_2$–$C_{10}$ alkenyl group in another embodiment, a $C_7$–$C_{40}$ arylalkyl group, a $C_7$–$C_{20}$ arylalkyl group in another embodiment, a $C_8$–$C_{40}$ arylalkenyl group, a $C_8$–$C_{22}$ arylalkenyl group in another embodiment, a $C_7$–$C_{40}$ alkylaryl group, a $C_7$–$C_{20}$ alkylaryl group in another embodiment, or $R^{11}$ and $R^{12}$, or $R^{11}$ and $R^{13}$, together with the atoms binding them, can form ring systems.

In structure (1), $M^2$ is silicon (Si), germanium (Ge) or tin (Sn), silicon (Si) or germanium (Ge) in one embodiment, and most desirably silicon (Si). Also, $R^8$ and $R^9$ are identical or different and have the meanings stated for $R^{11}$. Further, m and n are identical or different and are zero, 1 or 2, zero or 1 in one embodiment, and m plus n being zero, 1 or 2, desirably zero or 1.

Finally, in structure (1), the radicals $R^{10}$ are identical or different and have the meanings stated for $R^{11}$, $R^{12}$ and $R^{13}$. In one embodiment, $R^{10}$ is a phenyl group. The $R^{10}$ group or groups can be substituted on any position or positions on the indenyl ring system that is not already substituted as described above. Two adjacent $R^{10}$ radicals can be joined together to form a ring system, preferably a ring system containing from 4–6 carbon atoms.

Alkyl refers to straight or branched chain saturated, non-aromatic hydrocarbyl substituents. Alkenyl refers to strait or branched chain unsaturated substituents. Halogen (halogenated) refers to fluorine, chlorine, bromine or iodine atoms, preferably fluorine or chlorine. Aryl refers to cyclic aromatic moieties such as phenyl or naphthyl. Alkylaryl refers to an alkyl-substituted aryl, and arylalky refers to an aryl-substituted alkyl.

In another embodiment, the metallocene component is a compound of the structures (2) or (3):

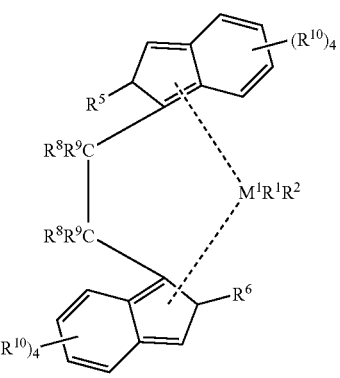

(2)

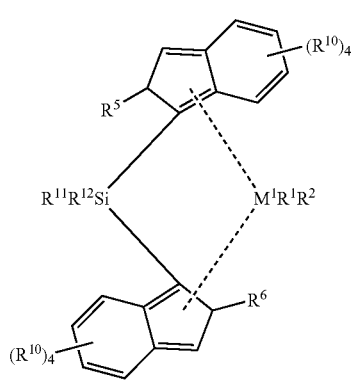

(3)

wherein $M^1$ is zirconium (Zr) or halfnium (Hf), $R^1$ and $R^2$ are methyl or chlorine, and $R^5$, $R^6$, $R^8$, $R^9$, $R^{10}$, $R^{11}$ and $R^{12}$ have the above-mentioned meanings.

The molecules represented by structures (1) through (3) can exist as both chiral and achiral structures. These chiral metallocenes may be used as a racemic (rac) mixture for the preparation of highly isotactic polyolefinic polymers such as isotactic polypropylene homopolymer or copolymer. It is also possible to use the pure R or S form. An optically active polymer can be prepared with these pure stereoisomeric forms. Preferably, the meso form of the metallocene is removed to ensure stereoregular polymerization takes place when the metallocene is used as a polymerization catalyst. For special products it is also possible to use rac/meso mixtures. Separation of the stereoisomers can be accomplished by known literature techniques.

Illustrative but non-limiting examples of the at least one metallocene component of the catalyst system includes the following:

Dimethylsilandiylbis(2-methyl-4-phenyl-1-indenyl)zirconium dichloride
Dimethylsilandiylbis(2-methyl-4,5-benzoindenyl)zirconium dichloride;
Dimethylsilandiylbis(2-methyl-4,6-diisopropylindenyl)zirconium dichloride;
Dimethylsilandiylbis(2-ethyl-4-phenyl-1-indenyl)zirconium dichloride;
Dimethylsilandiylbis(2-methyl-4-(α-naphthyl)-1-indenyl)zirconium dichloride
Dimethylsilandiylbis(2-ethyl-4-(α-naphthyl)-1-indenyl)zirconium dichloride
Dimethylsilandiylbis(2-methyl-4-(β-naphthyl)-1-indenyl)zirconium dichloride,
Dimethylsilandiylbis(2-ethyl-4-(β-naphthyl)-1-indenyl)zirconium dichloride
Phenyl(methyl)silandiylbis(2-methyl-4-phenyl-1-indenyl)zirconium dichloride,
Dimethylsilandiylbis(2-methyl-4-(1-naphthyl)-1-indenyl)zirconium dichloride,
Dimethylsilandiylbis(2-methyl-4-(2-naphthyl)-1-indenyl)zirconium dichloride,
Dimethylsilandiylbis(2-methyl-indenyl)zirconium dichloride,
Dimethylsilandiylbis(2-methyl-4,5-diisopropyl-1-indenyl)zirconium dichloride,
Dimethylsilandiylbis(2,4,6-trimethyl-1-indenyl)zirconium dichloride,
Phenyl(methyl)silandiylbis(2-methyl-4,6-diisopropyl-1-indenyl)zirconium dichloride,
1,2-Ethandiylbis(2-methyl-4,6-diisopropyl-1-indenyl)zirconium dichloride,
1,2-Butandiylbis(2-methyl-4,6-diisopropyl-1-indenyl)zirconium dichloride,
Dimethylsilandiylbis(2-methyl-4-ethyl-1-indenyl)zirconium dichloride,
Dimethylsilandiylbis(2-methyl-4-isopropyl-1-indenyl)zirconium dichloride,
Dimethylsilandiylbis(2-methyl-4-t-butyl-1-indenyl)zirconium dichloride,
Phenyl(methyl)silandiylbis(2-methyl-4-isopropyl-1-indenyl)zirconium dichloride,
Dimethylsilandiylbis(2-ethyl-4-methyl-1-indenyl)zirconium dichloride,
Dimethylsilandiylbis(2,4-dimethyl-1-indenyl)zirconium dichloride,
Dimethylsilandiylbis(2-methyl-4-ethyl-1-indenyl)zirconium dichloride,
Dimethylsilandiylbis(2-methyl-4-(5-acenaphthyl)-1-indenyl)zirconium dichloride,
Phenyl(methyl)silandiylbis(2-methyl-4,5-benzo-1-indenyl)zirconium dichloride,
Phenyl(methyl)silandiylbis(2-methyl-4,5-(methylbenzo)-1-indenyl)zirconium dichloride,
Phenyl(methyl)silandiylbis(2-methyl-4,5-(tetramethylbenzo)-1-indenyl)zirconium dichloride,
Phenyl(methyl)silandiylbis(2-methyl-4-(5-acenaphthyl)-1-indenyl)zirconium dichloride,
1,2-Ethandiylbis(2-methyl-4,5-benzo-1-indenyl)zirconium dichloride,
1,2-Butandiylbis(2-methyl-4,5-benzo-1-indenyl)zirconium dichloride,
Dimethylsilandiylbis(2-methyl-4,5-benzo-1-indenyl)zirconium dichloride,
1,2-Ethandiylbis(2,4,7-trimethyl-1-indenyl)zirconium dichloride,
Dimethylsilandiylbis(2-methyl-1-indenyl)zirconium dichloride,
1,2-Ethandiylbis(2-methyl-1-indenyl)zirconium dichloride,
Phenyl(methyl)silandiylbis(2-methyl-1-indenyl)zirconium dichloride,
Diphenylsilandiylbis(2-methyl-1-indenyl)zirconium dichloride,
1,2-Butandiylbis(2-methyl-1-indenyl)zirconium dichloride,
Dimethylsilandiylbis(2-ethyl-1-indenyl)zirconium dichloride,
Dimethylsilandiylbis(2-methyl-5-isobutyl-1-indenyl)zirconium dichloride,
Phenyl(methyl)silandiylbis(2-methyl-5-isobutyl-1-indenyl)zirconium dichloride,
Dimethylsilandiylbis(2-methyl-5-t-butyl-1-indenyl)zirconium dichloride,
Dimethylsilandiylbis(2,5,6-trimethyl-1-indenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl;
Dimethylsilandiylbis(2-methyl-4,6-diisopropylindenyl)zirconium dimethyl;
Dimethylsilandiylbis(2-ethyl-4-phenyl-1-indenyl)zirconium dimethyl;
Dimethylsilandiylbis(2-methyl-4-(α-naphthyl)-1-indenyl)zirconium dimethyl
Dimethylsilandiylbis(2-ethyl-4-(α-naphthyl)-1-indenyl)zirconium dimethyl
Dimethylsilandiylbis(2-methyl-4-(β-naphthyl)-1-indenyl)zirconium dimethyl,
Dimethylsilandiylbis(2-ethyl-4-(β-naphthyl)-1-indenyl)zirconium dimethyl
Phenyl(methyl)silandiylbis(2-methyl-4-phenyl-1-indenyl)zirconium dimethyl,
Dimethylsilandiylbis(2-methyl-4-(1-naphthyl)-1-indenyl)zirconium dimethyl,
Dimethylsilandiylbis(2-methyl-4-(2-naphthyl)-1-indenyl)zirconium dimethyl,
Dimethylsilandiylbis(2-methyl-indenyl)zirconium dimethyl,
Dimethylsilandiylbis(2-methyl-4,5-diisopropyl-1-indenyl)zirconium dimethyl,
Dimethylsilandiylbis(2,4,6-trimethyl-1-indenyl)zirconium dimethyl,
Phenyl(methyl)silandiylbis(2-methyl-4,6-diisopropyl-1-indenyl)zirconium dimethyl,
1,2-Ethandiylbis(2-methyl-4,6-diisopropyl-1-indenyl)zirconium dimethyl,
1,2-Butandiylbis(2-methyl-4,6-diisopropyl-1-indenyl)zirconium dimethyl,
Dimethylsilandiylbis(2-methyl-4-ethyl-1-indenyl)zirconium dimethyl,
Dimethylsilandiylbis(2-methyl-4-isopropyl-1-indenyl)zirconium dimethyl, Dimethylsilandiylbis(2-methyl-4-t-butyl-1-indenyl)zirconium dimethyl,
Phenyl(methyl)silandiylbis(2-methyl-4-isopropyl-1-indenyl)zirconium dimethyl,
Dimethylsilandiylbis(2-ethyl-4-methyl-1-indenyl)zirconium dimethyl,
Dimethylsilandiylbis(2,4-dimethyl-1-indenyl)zirconium dimethyl,
Dimethylsilandiylbis(2-methyl-4-ethyl-1-indenyl)zirconium dimethyl,
Dimethylsilandiylbis(2-methyl-4-(5-acenaphthyl)-1-indenyl)zirconium dimethyl,
Phenyl(methyl)silandiylbis(2-methyl-4,5-benzo-1-indenyl) zirconium dimethyl,
Phenyl(methyl)silandiylbis(2-methyl-4,5-(methylbenzo)-1-indenyl)zirconium dimethyl,
Phenyl(methyl)silandiylbis(2-methyl-4,5-(tetramethylbenzo)-1-indenyl) zirconium dimethyl,
Phenyl(methyl)silandiylbis (2-methyl-4-(5-acenaphthyl)-1-indenyl)zirconium dimethyl,
1,2-Ethandiylbis(2-methyl-4,5-benzo-1-indenyl)zirconium dimethyl,
1,2-Butandiylbis(2-methyl-4,5-benzo-1-indenyl)zirconium dimethyl,
Dimethylsilandiylbis(2-methyl-4,5-benzo-1-indenyl)zirconium dimethyl,
1,2-Ethandiylbis(2,4,7-trimethyl-1-indenyl)zirconium dimethyl,
Dimethylsilandiylbis(2-methyl-1-indenyl)zirconium dimethyl,
1,2-Ethandiylbis(2-methyl-1-indenyl)zirconium dimethyl,
Phenyl(methyl)silandiylbis(2-methyl-1-indenyl)zirconium dimethyl,
Diphenylsilandiylbis(2-methyl-1-indenyl)zirconium dimethyl,
1,2-Butandiylbis(2-methyl-1-indenyl)zirconium dimethyl,
Dimethylsilandiylbis(2-ethyl-1-indenyl)zirconium dimethyl,
Dimethylsilandiylbis(2-methyl-5-isobutyl-1-indenyl)zirconium dimethyl,
Phenyl(methyl)silandiylbis(2-methyl-5-isobutyl-1-indenyl) zirconium dimethyl,
Dimethylsilandiylbis(2-methyl-5-t-butyl-1-indenyl)zirconium dimethyl,
Dimethylsilandiylbis(2,5,6-trimethyl-1-indenyl)zirconium dimethyl, and the like.

These metallocene catalyst components are described in U.S. Pat. Nos. 6,143,686, 5,145,819; 5,243,001; 5,239,022; 5,329,033; 5,296,434; and 5,276,208; and 5,374,752; and EP 549 900 and 576 970.

The metallocene component selected for use in the catalyst system of this invention is a metallocene which, when used alone, produces isotactic, crystalline propylene polymer and when used in combination with another metallocene, produces polymer having the attributes desired for the particular application of interest. Desirable metallocenes are those selected from formulas 2 and/or 3 which when used alone to produce propylene homopolymer, are capable of producing an isotactic polymer having a weight average molecular weight of from about 25,000 to about 200,000 at commercially attractive temperatures of from about 50° C. to about 120° C.

In another embodiment of the invention, a comonomer may be used with propylene to form a copolymer suitable for the fiber and fabric. The metallocenes used may show different molecular weight responses when in the presence of comonomer. This will also affect the molecular weight distribution of the product. For example, we have found that the incorporation of up to 10 wt % comonomer such as a $C_2$ to $C_{10}$ alpha-olefin comonomer in one embodiment, and up to 5 wt % ethylene comonomer in another embodiment, during the polymerization process as described herein results in a substantial broadening of the molecular weight distribution at the high molecular weight end.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution. Also, the resin, prior to forming the fibers, may be spiked or blended with a Ziegler-Natta produced polymer, or other polymer having a relatively low or high MFR and higher tacticity component. The added polymer may be a Ziegler-Natta produced polymer in powder form from less than 10 wt % up to 50 wt % of the entire polymer mixture in one embodiment.

In yet another embodiment of the invention, the metallocene component is a bridged 2,4 di-substituted indenyl metallocene, wherein at least the 2 and 4 positions on the indenyl ring are substituted as described in structure (1). Examples of such metallocenes are rac-:
Dimethylsilandiylbis(2-methyl-4-phenyl-1-indenyl)zirconium dichloride,
Dimethylsilandiylbis(2,4-dimethylindenyl)zirconium dichloride,
Dimethylsilandiylbis(2,5,6-trimethylindenyl)zirconium dichloride,
Dimethylsilandiylbis(4,5,6,7-tetrahydroindenyl)zirconium dichloride,
Dimethylsilandiylbis(2-methyl-4,5-benzoindenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl,
Dimethylsilandiylbis(2-methyl-4,6-diisopropylindenyl)zirconium dimethyl,
Dimethylsilandiylbis(2-ethyl-4-phenyl-1-indenyl)zirconium dimethyl,
Dimethylsilandiylbis(2-methyl-4-(α-naphthyl)-1-indenyl) zirconium dimethyl,
Dimethylsilandiylbis(2-methyl-4-(β-naphthyl)-1-indenyl) zirconium dimethyl,
Phenyl(methyl)silandiylbis(2-methyl-4-phenyl-1-indenyl) zirconium dimethyl,
Dimethylsilandiylbis(2-methyl-4-(1-naphthyl)-1-indenyl) zirconium dimethyl,
Dimethylsilandiylbis(2-methyl-4-(2-naphthyl)-1-indenyl) zirconium dimethyl, and
Dimethylsilandiylbis(2-methyl-indenyl)zirconium dimethyl.

In yet another embodiment of the invention, the metallocene component is a bridged 4-phenyl-1-indenyl substituted metallocene ("bridged 4-phenyl indenyl") such as, for example, dimethylsilandiylbis(2-methyl-4-phenyl-1-indenyl)zirconium dichloride and phenyl(methyl)silandiylbis(2-methyl-4-phenyl-1-indenyl)zirconium dimethyl, and the like, wherein the 2-position is substituted as described in structure (1), and the 4-position is phenyl substituted. The bridged 4-phenyl indenyl substituted metallocene may be described as in structure (4):

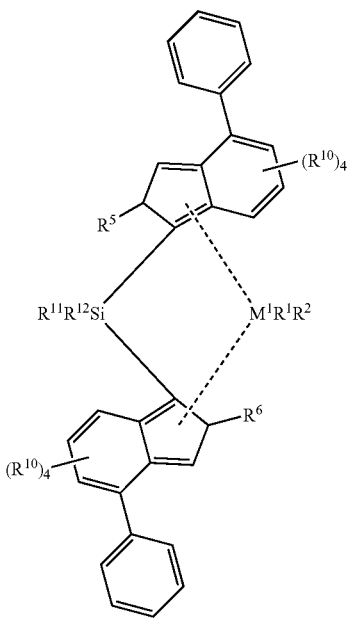

(4)

wherein $R^5$, $R^6$, $R^{10}$, $R^{11}$ and $R^{12}$ are as defined above, $M^1$ is zirconium (Zr) or halfnium (Hf), and $R^1$ and $R^2$ are either a halogen, hydrogen, or methyl, the phenyl group is in the so called "4" position on the indenyl ring. $R^5$ and $R^6$ are $C_1$ to $C_5$ alkyl groups in a desirable embodiment. Embodiments of the structure (3) are dimethylsilandiylbis (2-methyl-4-phenyl-1-indenyl)zirconium dichloride, phenyl(methyl)silandiylbis(2-methyl-4-phenyl-1-indenyl)zirconium dichloride dimethylsilandiylbis(2-methyl-4-phenyl-1-indenyl) zirconium dimethyl, and phenyl(methyl)silandiylbis(2-methyl-4-phenyl-1-indenyl)zirconium dimethyl. When $R^1$ and/or $R^2$ are halogens such as chloride, the catalyst system desirably includes a Lewis Acid such as an alkyl aluminum compound, an example of which include triethylaluminum (TEAL)and methylaluminumoxane (MAO).

Activators

Embodiments of the activator component is herein described. Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins.

In one embodiment, ionizing activators are used to activate the metallocenes. These activators can be "non-ionic" or "ionic" (also called non-coordinating anion activators or NCA activators). The ionic activators are compounds such as tri(n-butyl)ammonium tetrakis(pentaflurophenyl)boron, which ionize the neutral metallocene compound. Such ionizing compounds may contain an active proton, or some other cation associated with but not coordinated or only loosely associated with the remaining ion of the ionizing compound. Combinations of activators may also be used, for example, alumoxane and ionizing activators in combinations, see for example, WO 94/07928. The non-ionic activator precursors that can serve as the NCA activators are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., trisperfluorophenyl boron, trisperfluoronaphthylboron, or trisperfluorobiphenyl boron, and other highly fluorinated trisaryl boron compounds.

The term "non-coordinating anion" describes an anion which either does not coordinate to the cationic metallocene or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituents or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

In a desirable embodiment of the invention, the activator and metallocene components are contacted with a support such as a silicon or fluorided silicon support (discussed further below). Thus, these NCA activator precursors typically do not possess any reactive ligands which can be protonated by the hydroxyl groups of the metal oxide (the silanol group proton) of the support, when present. For example, any Group 13 element based Lewis acids having only alkyl, halo, alkoxy, and/or amido ligands, which are readily hydrolyzed in aqueous media, are not suitable. At least one ligand of the NCA activator must be sufficiently electron-withdrawing to achieve the needed acidity, for example, trisperfluorophenyl boron, under typical reaction conditions.

Typical metal/metalloid centers for the NCA activator will include boron, aluminum, antimony, arsenic, phosphorous and gallium. In one embodiment, the NCA activator is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di(trifluoromethyl)phenyl)boron, tris(di-t-butylmethylsilyl)perfluorophenylboron, and other highly fluorinated trisarylboron compounds. Other suitable activators are disclosed by Chen and Marks, 100 *Chemical Reviews* 1392–1434 (2000); Yang et al., 116 *J. Am. Chem. Soc.* 10015–10031 (1994); Yang et al., 113 *J. Am. Chem. Soc.* 3623–3625 (1991); Chien et al. 113 *J. Am. Chem. Soc.* 8570–8571 (1991); Bochmann et al. 12 *Organometallics* 633–640 (1999); Herfert et al. 14 *Makromol. Chem., Rapid Commun.* 91–96 (1993); and in EP 0 704 463 and EP 0 513 380.

The use of ionizing ionic compounds not containing an active proton but capable of producing both the active metallocene cation and a noncoordinating anion is also known. See, EP-A-0 426 637 and EP-A- 0 573 403. An additional method of making the ionic catalysts uses ionizing anion pre-cursors which are initially neutral Lewis acids but form the cation and anion upon ionizing reaction with the metallocene compounds, for example the use of tris (pentafluorophenyl) boron. See EP-A-0 520 732. Ionic catalysts for addition polymerization can also be prepared by oxidation of the metal centers of transition metal compounds by anion pre-cursors containing metallic oxidizing groups along with the anion groups, see EP-A-0 495 375. Examples of suitable ionic NCA activators, include:

trialkyl-substituted ammonium salts such as:
- triethylammonium tetraphenylborate;
- tripropylammonium tetraphenylborate;
- tri(n-butyl)ammonium tetraphenylborate;
- trimethylammonium tetrakis(p-tolyl)borate;
- trimethylammonium tetrakis(o-tolyl)borate;
- tributylammonium tetrakis(pentafluorophenyl)borate;
- tripropylammonium tetrakis(o,p-dimethylphenyl)borate;
- tributylammonium tetrakis(m,m-dimethylphenyl)borate;
- tributylammonium tetrakis(p-trifluoromethylphenyl)borate;
- tributylammonium tetrakis(pentafluorophenyl)borate; and
- tri(n-butyl)ammonium tetrakis(o-tolyl)borate;

N,N-dialkyl anilinium salts such as:
- N,N-dimethylanilinium tetrakis(pentafluorophenyl)borate;
- N,N-dimethylaniliniumtetrakis(heptafluoronaphthyl)borate;
- N,N-dimethylanilinium tetrakis(perfluoro-4-biphenyl)borate;
- N,N-dimethylanilinium tetraphenylborate;
- N,N-diethylanilinium tetraphenylborate; and
- N,N-2,4,6-pentamethylanilinium tetraphenylborate;

dialkyl ammonium salts such as:
- di-(isopropyl)ammonium tetrakis(pentafluorophenyl)borate; and
- dicyclohexylammonium tetraphenylborate; and triaryl phosphonium salts such as:
- triphenylphosphonium tetraphenylborate;
- tri(methylphenyl)phosphonium tetraphenylborate; and
- tri(dimethylphenyl)phosphonium tetraphenylborate.

Further examples of suitable ionic NCA activators include:
- tropillium tetrakis(pentafluorophenyl)borate;
- triphenylmethylium tetrakis(pentafluorophenyl)borate;
- benzene(diazonium)tetrakis(pentafluorophenyl)borate;
- tropillium phenyltris(pentafluorophenyl)borate;
- triphenylmethylium phenyl-(trispentafluorophenyl)borate;
- benzene(diazonium)phenyl-tris(pentafluorophenyl)borate;
- tropillium tetrakis(2,3,5,6-tetrafluorophenyl)borate;
- triphenylmethylium tetrakis(2,3,5,6-tetrafluorophenyl)borate;
- benzene(diazonium)tetrakis(3,4,5-trifluorophenyl)borate;
- tropillium tetrakis(3,4,5-trifluorophenyl)borate;
- benzene(diazonium)tetrakis(3,4,5-trifluorophenyl)borate;
- tropillium tetrakis(3,4,5-trifluorophenyl)aluminate;
- triphenylmethylium tetrakis(3,4,5-trifluorophenyl)aluminate;
- benzene(diazonium)tetrakis(3,4,5-trifluorophenyl)aluminate;
- tropillinum tetrakis(1,2,2-trifluoroethenyl)borate;
- triphenylmethylium tetrakis(1,2,2-trifluoroethenyl)borate;
- benzene(diazonium)tetrakis(1,2,2-trifluoroethenyl)borate;
- tropillium tetrakis(2,3,4,5-tetrafluorophenyl)borate;
- triphenylmethylium tetrakis(2,3,4,5-tetrafluorophenyl)borate; and
- benzene(diazonium)tetrakis(2,3,4,5-tetrafluorophenyl)borate.

In the embodiment where the metallocene component metal ligands include halogen moieties (for example, bis-cyclopentadienyl zirconium dichloride, wherein the $R^1$ and $R^2$ groups in structures 1–3 are a halogen) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds. For example, triethylaluminum (TEAL) or MAO can be used to form the in situ reactive metallocene component.

Support Composition

The catalyst systems used in the process of this invention are preferably supported using a porous particulate material, such as for example, talc, inorganic oxides, inorganic chlorides and resinous materials such as polyolefins or other polymeric compounds. In particular, the catalyst system is typically the resultant composition from contacting at least the metallocene component, the activator component, and the support component.

Desirable support materials are porous inorganic oxide materials, which include those from the Periodic Table of Elements of Groups 2, 3, 4, 5, 13 or 14 metal oxides. Silica, alumina. silica-alumina, and mixtures thereof are particularly preferred. Other inorganic oxides that may be employed either alone or in combination with the silica, alumina or silica-alumina are magnesia, titania, zirconia, and the like.

In one embodiment, the support material is porous silica which has a surface area in the range of from 10 to 700 $m^2$/g, a total pore volume in the range of from 0.1 to 4.0 cc/g and an average particle size in the range of from 10 to 500 μm. Desirably, the surface area is in the range of from 50 to 500 $m^2$/g, the pore volume is in the range of from 0.5 to 3.5 cc/g and the average particle size is in the range of from 20 to 200 μm. In yet another embodiment, the surface area is in the range of from 100 to 400 $m^2$/g, the pore volume is in the range of from 0.8 to 3.0 cc/g and the average particle size is in the range of from 30 to 100 μm. The average pore size of typical porous support materials is in the range of from 10 to 1000 Å. Desirably, a support material is used that has an average pore diameter of from 50 to 500 Å, and from 75 to 350 Å in another embodiment. It may be desirable to dehydrate the silica at a temperature of from about 100° C. to about 800° C. anywhere from about 3 to about 24 hours.

In another embodiment of the support, the porous silica is fluorided by treatment with a fluorine compound prior to reacting the support with the metallocene or activator components. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, $NH_4BF_4$, $(NH_4)_2SiF_6$ are desirable embodiments.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to the vessel for dehydration or calcining the support. Accordingly, the fluorine concentration present on the support is in the range of from 0.6 to 3.5 wt % of support.

Another method of treating the support with the fluorine compound is to dissolve the fluorine compound in a solvent, such as water, and then contact the support with the fluorine compound containing solution. When water is used and silica is the support, it is desirable to use a quantity of water which is less than the total pore volume of the support.

Dehydration or calcining of the silica is not necessary prior to reaction with the fluorine compound. Desirably, the reaction between the silica and fluorine compound is carried out at a temperature of from about 100° C. to about 1000° C., and more desirably from about 200° C. to about 600° C. for about two to eight hours.

The metallocenes, activator and support material may be combined in any number of ways. Suitable support techniques are described in U.S. Pat. Nos. 5,972,823 and 5,643,847, and WO 00/12565.

Regardless of whether the metallocenes and their activator are separately precontacted or whether the metallocenes and activator are combined at once, the total volume of reaction solution applied to porous support is less than about 4 times the total pore volume of the porous support in one embodiment, less than about 3 times the total pore volume of the porous support in another embodiment, and in the range of from more than about 1 to less than about 2.5 times the total pore volume of the porous support in yet another embodiment. Procedures for measuring the total pore volume of porous support are well known in the art. The preferred method is described in 1 EXPERIMENTAL METHODS IN CATALYST RESEARCH 67–96 (Academic Press 1968).

Methods of supporting ionic catalysts comprising metallocene cations: and noncoordinating anions are described in WO 91/09882, WO 94/03506, WO 96/04319 and in co-pending U.S. Ser. No. 09/339,128, filed Jun. 24, 1999. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide or fluorided-modified supports such that the Lewis acid becomes bound to the support and a hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893.

Polymerization Process

The supported catalytic system of the present invention can be used in any suitable polymerization technique. Methods and apparatus for effecting such polymerization reactions are well known. The supported catalyst activators can be used in similar amounts and under similar conditions to known olefinic polymerization catalysts.

As used herein, the term "polymerization" includes copolymerization and terpolymerization and the terms olefins and olefinic monomer includes α-olefins, diolefins, strained cyclic olefins, styrenic monomers, acetylenically unsaturated monomers, cyclic olefins alone or in combination with other unsaturated monomers. The metallocene supported catalyst composition is useful in coordination polymerization of unsaturated monomers conventionally known to be polymerizable under coordination polymerization conditions. Monomers suitable for the polymer of the invention include ethylene and $C_3$ to $C_{12}$ α-olefins. Such conditions also are well known and include solution polymerization, slurry polymerization, and low pressure gas phase polymerization. The metallocene supported catalysts compositions of the present invention are thus particularly useful in the known operating modes employing fixed-bed, moving-bed, fluid-bed, or slurry processes conducted in single, series or parallel reactors.

Polymerization techniques for olefin polymerization can be solution polymerization, slurry polymerization, or gas phase polymerization techniques. Methods and apparatus for effecting such polymerization reactions are well known and described in, for example, 12 ENCYCLOPEDIA OF POLYMER SCIENCE AND ENGINEERING 504–541 (John Wiley and Sons, 1988) and in 2 METALLOCENE-BASED POLYOLEFINS 366–378 (John Wiley and Sons, 2000). The catalyst of the present invention can be used in similar amounts and under similar conditions to known olefin polymerization catalysts.

The polymers of this invention can be prepared with the catalysts just described in either batch, semi-continuous, or continuous propylene polymerization systems. Desirable polymerization systems are the continuous processes, including diluent slurry, bulk slurry (loop and stirred tank), and gas phase (stirred and fluid bed). Continuous polymerization can be carried out in a single reactor of any of the above types, in two or more reactors operating in series, or in two or more reactors operating in parallel. When two or more reactors are operating in a continuous process, the multiple reactors can be all of the same type or they may be any combination of the types.

Hydrogen gas is often used in olefin polymerization to control the final properties of the polyolefin, such as described in POLYPROPYLENE HANDBOOK 76–78 (Hanser Publishers, 1996). Using the catalyst system of the present invention, is known that higher concentrations (partial pressures) of hydrogen increase the melt flow rate (MFR) of the polyolefin generated, in particular, polypropylene. The MFR can thus be influenced by the hydrogen concentration, which in turn influences the optimal fiber manufacturing process temperatures. Typically, the higher the MFR of the polypropylene, the finer the fibers and more uniform the coverage can be obtained in the fabric. Also, higher MFR resins can be processed at lower temperatures and tend to produce less shot. The final quality of the fabric made from the fibers of the invention are thus influenced by hydrogen concentration during polymerization, or the final MFR of the polymer.

Polypropylene made from the above described catalyst system and process have improved properties. The polypropylene tends to be highly isotactic as measured by the meso run length of the polypropylene chains, while maintaining a relatively narrow molecular weight distribution. Isotactic polypropylenes are those polymers wherein the pendent hydrocarbyl groups of the polymer chain are ordered in space in the same side or plane of the polymer backbone chain. Using isotactic polypropylene as an example, the isotactic structure is typically described as having the pendent methyl groups attached to the ternary carbon atoms of successive monomeric units on the same side of a hypothetical plane through the carbon backbone chain of the polymer, as shown in below:

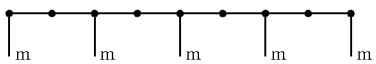

The degree of isotactic regularity may be measured by NMR techniques, and typical nomenclature for an isotactic pentad is "mmmm", which each "m" representing a "meso" dyad or successive methyl groups on the same side in the plane. Single insertions of inverted configuration give rise to rr triads as shown below:

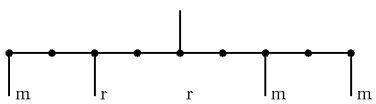

As is known in the art, any deviation or inversion in the regularity of the polymer structure lowers the degree of isotacticity and hence crystallinity of which the polymer is capable. Ideally, the longer the mmmm runs or meso run lengths, the more highly isotactic the polypropylene. Defects and inversions such as the 1, 3 or 2, 1 insertion are undesirable when isotactic polymer is desired. The data below reflects the highly isotactic nature of the polypropylene embodiments of the present invention. Polymers ("resins") of the present invention have less than 50 stereo defects per 1000 units in one embodiment, and less than 25 stereo defects per 1000 units in another embodiment, and meso run lengths (MRL) of greater than 100 in yet another embodiment as indicated in NMR.

Given that various ionic and/or metallic species are used as catalysts and cocatalysts in the polymerization process, the final polymer may have some of these components present. The polymer may be washed (or "deashed") to remove some or all of these materials. The process of washing the polymer is performed after the polymerization process on granules or beads of the homopolymer. In one embodiment, the granules of polymer are washed in a counter current with a solvent such as an alcohol, for example isobutanol (2-methyl-1-propanol), and liquid propylene at a temperature of from 25° C. to 80° C., either in a mixture or alone.

The presence of metals or ionic components in the polymer may be measured—before or after washing—by methods known to those skilled in the art. In one embodiment, the metals can be measured using Inductively Coupled Plasma Atomic Emission Spectroscopy (ICP-AES) (Jobin-Yvon Emission Division of Instrument S.A., Model JY138 Ultrace), while chloride and silicon ions were determined using X-Ray Fluorescence (XRF) (Philips X-Ray Analytical Co, Model PW1404). The instruments are calibrated by determining the intensities of a series of known concentration standards and fitting those values to a calibration curve. For ICP-AES, the samples to be measured were first ashed, then dissolved in an appropriate acidic solution, followed by appropriate dilution to fall within the standard calibration curve. For XRF, compression molded plaques were prepared for chloride (Cl$^-$) and Si determination.

Due to the high reactivity of the catalyst system described herein the polymer and film of the present invention is also characterized in having a relatively low level of metal and ionic recoverables both prior to deashing and after deashing relative to other methods of making polymers and films. The aluminum and chlorine recoverables (combined) of the homopolymer of the invention range from less than 25 ppm in one embodiment, less than 15 ppm in another embodiment, and less than 10 ppm in yet another embodiment. In yet another embodiment, the aluminum and chlorine recoverables ranges from 10 ppm to 25 ppm.

Fiber and Fabric Manufacturing Process

Meltblown fibers were prepared using a meltblown process well known in the art for non-woven fabric production. An overview of the process may be obtained from *Melt Blown Process*, MELT BLOWN TECHNOLOGY Today 7–12 (Miller Freeman Publ., Inc. 1989). The testing of samples is accomplished using a TANDEC Accurate Products Melt Blown line; the extruder was a 5 cm with a 30:1 length:diameter ratio.

The melt blowing process was performed as follows in the examples in Tables 3–5. Melt blown fabrics were made from the materials described in Table 2 utilizing the Accurate Products melt blown pilot line located in the TANDEC building at The University of Tennessee in Knoxville. This pilot line was described earlier in this document. The die has 501 holes over a 20" width (20 holes/inch). Each hole is 0.015 in (0.38 mm) in diameter. The set back and die gap in the die were both set at 0.030" (0.76 mm). The fibers were sprayed horizontally onto a rotating collector drum. The drum has a porous metallic screen surface with a partial vacuum pulled from inside at the point the fibers collect on the drum to help cool the fibers and hold them onto the forming surface. As the fibers collect on the drum they form a fabric which is continuously removed and wound onto a roll.

In the data of fiber and fabric characteristics, in going from Table 3 to Table 5, the conditions are progressively higher throughput examples. The data in Table 3 is at 0.4 ghm (grams/hole/min) and 8 inch DCD (die-to-collector distance). The data in Table 4 are at 0.8 ghm and 10 inch DCD. The data in Table 5 is at 0.8 ghm and 8 inch DCD. The resin may be processed at a temperature at or above its melting point, and below the flash point of the resin. In the present examples, the processing temperature (die temperature) ranges from 390 to 450° F., and the air pressure ranges from 2 to 12 psi as indicated in the Tables.

All the fabrics described in Table 3 were made at a throughput of 0.4 grams/hole/min (ghm) and a die-to-collector distance of 8 inches, and have a basis weight of approximately 25 grams/m$^2$ (gsm). The die and process air temperatures were varied in a range of from 390 to 450° F. in order to find the best processing temperature for each material. Higher temperatures led to excessive shot and lower temperature produced stiff or brittle fabrics unsuitable for use. This range was selected based on previous experience and was adjusted during the trial to produce the best fabrics. The process air rate was optimized for each resin at each condition by increasing the air rate until "fly" was observed, then reducing the air rate until the "fly" disappeared. This gives the highest practical air rate and generally produces the best quality fabric for each resin at that temperature, throughput, and DCD. The fabrics were then given a "shot" rating by a skilled technician and tested for hydrohead and air permeability. The best fabrics produced over the range of temperatures were then used in the comparison. The fabrics in Example 1 were produced from resins with a MFR in the range of 1000–2000.

All the fabrics described in Table 4 were made as described in Table 2 except that a throughput of 0.8 grams/hole/min (ghm) and a die-to-collector distance of 10 inches were used. The fabrics produced had a basis weight of approximately 25 grams/m² (gsm). The fabrics in Table 4 were produced from resins with a MFR in the range of approximately 1400–2000. Also, fabrics were produced from resins with MFRs of approximately 2300 to 2800. The inventive fabric has a superior hydrohead to the comparative metallocene fabric and a much lower shot level. The air permeability value of the inventive fabric also indicates it is more uniform and has a smaller average pore size than the comparative fabric.

All the fabrics described in Table 5 were made as described in Table 2 except that a throughput of 0.8 grams/hole/min (ghm) and a die-to-collector distance of 8 inches were used. The fabrics were produced from resins with a MFR in the range of approximately 1000–2000. The fabrics produced had a basis weight of approximately 25 grams/m² (gsm). The inventive fabric E1-F has a higher hydrohead and fewer shot than the comparative metallocene fabric C1 of similar MFR. The air permeability of the inventive fabric indicates it is more uniform fabric than the comparative fabric. The data is described further below.

The present invention is a fiber and a fabric manufactured from the fiber comprising reactor grade polypropylene (not treated with peroxides or molecular weight-reducing agents) having a MFR of from 100 to 5000 dg/min in one embodiment, and from 500 to 3000 dg/min in another embodiment, greater than 1000 dg/min in yet another embodiment, and from 1000 to 2000 dg/min in yet another embodiment, and having less than 50 stereo defects per 1000 units. The polypropylene typically has a MWD in the range from 1 to 5 in one embodiment, and from 2 to 4 in another embodiment, and from 2 to 3 in yet another embodiment.

A variety of additives may be incorporated into the polymer used to make the fibers and fabric for various purposes. Such additives include, for example, stabilizers, antioxidants, fillers, colorants, nucleating agents and mold release agents. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin product or other highly crystalline polymer. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Test Methods

Molecular Weight Determinations. Molecular weights and molecular weight distributions (MWD) were determined using Gel Permeation Chromatography. Techniques for determining the molecular weight (Mn and Mw) and molecular weight distribution (MWD) were used as in U.S. Pat. No. 4,540,753 to Cozewith et al. and references cited therein, and in Verstrate et al., 21 *Macromolecules* 3360 (1988) and references cited therein.

Hydrohead. Hydrostatic Head (HH) is INDA Standard Test IST 80.6 (98). A section of fabric is pulled from the sample roll for testing after discarding the first few wraps to insure a clean, undisturbed sample. Four specimens are selected, two from each side (right and left) of the fabric. Hydroheads are measured on each specimen and the results averaged. The units of measure for the values of HH are in inches.

Air permeability. Air Permeability is INDA Standard Test IST 70.0–70 (R82). Ten specimens are selected from the sample fabric; five from each side of the fabric. The air permeability is measured on each specimen and the results averaged. Units of air permeability values are in ft³/ft²/min.

Shot. Shot is a measure of the number of deformations, defects or holes in the formed polymer fabric. A defect can be, for example, an agglomeration of polymer material from 10 to 1000 times greater in diameter than the diameter of the fibers. Qualitative test methods for determining "shot" can be found in U.S. Pat. No. 5,723,217. Fabrics samples are pulled off the MB fabric roll at random and a section several feet long encompassing the full width of the fabric is cut from the roll. The samples are held against a backlit glass plate and visually rated from "1" to "5" according to the level of shot (1=very low shot; "5"=very high level of shot). A set of photographs of MB fabrics containing shot levels corresponding to each category from 1 to 5 serve as standards for rating the fabrics. A shot value is then determined by counting the number of defects or holes per unit area. This can be done by, for example, viewing the fabric in a microscope and manually counting the number of shot per unit area. Also, see Yan, Z. and Bresee, R. R., *Flexible Multifunctional Instrument for Automated Nonwoven Web Structure Analysis*, 69 TEXTILE RES. J. 795–804 (1999).

Thermal Analysis. Thermodynamic heat of fusion data (Hc, Hf) were determined by differential scanning calorimetry (DSC), the procedure for which is as follows. From 6 to 10 mg of a sheet of the polymer pressed at approximately 200° C. to 230° C. is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion. The melting point is recorded as the temperature of the greatest heat absorption within the range of melting of the sample. This is called the first melt. The sample is then cooled at a rate of 10° C./min to 25° C. The non-isothermal crystallization temperature is recorded as the temperature of greatest heat generation, typically between 100° C. to 125° C. The area under the peak corresponds to the heat of crystallization (Hc).

The sample is remelted by heating a second time, and this is called the second melt, and is more reproducible than the first melt. The peak melting temperature from the second melt is recorded as the "2d Tm". The half time of crystallization ($\tau_{1/2}$) can be determined by melting the sample at 200° C. for 5 minutes, quenching the sample from the melt as rapidly as possible in the DSC to a preset temperature, maintaining the sample at that temperature, and allowing the sample to crystallize isothermally. Isothermal crystallization within the range of 120° C. to 135° C. generally works best for polypropylene. Temperatures of 125° C. and 128° C. were used in the examples. Heat generation is then measured as a function of time while the sample crystallizes. The area under the peak is measured and the time which divides the peak into two equal areas is defined as the half-time. of crystallization. (The area under the peak is measured and divided into two equal areas along the time scale. The elapsed time corresponding to the time at which half the area of the peak is reached is defined as the half-time of crystallization). The shorter the time, the faster the crystallization rate at a given crystallization temperature. The most consistent results are obtained on well-blended materials such as extruded or fabricated samples.

$^{13}$C NMR. $^{13}$C NMR data was obtained at 100 MHz at 125° C. on a Varian VXR 400 NMR spectrometer. A 90° C. pulse, an acquisition time of 3.0 seconds, and a pulse delay of 20 seconds was employed. The spectra were broad band decoupled and were acquired without gated decoupling. Similar relaxation times and nuclear Overhauser effects are expected for the methyl resonances of polypropylenes, which were the only homopolymer resonances used for quantitative purposes. A typical number of transients collected was 2500. The sample was dissolved in tetrachlorethane-d$_2$ at a concentration of 15% by weight. All spectral frequencies were recorded with respect to an internal tetramethylsilane standard. In the case of the polypropylene homopolymer, the methyl resonances were recorded with respect to 21.81 ppm for mmmm, which is close to the reported literature value of 21.855 ppm for an internal tetramethylsilane standard. The pentad assignments used are well established.

Melt Flow Rate. MFR was determined via the method of ASTM D 1238-95 Condition L.

EXAMPLES

The present invention, while not meant to be limiting by, may be better understood by reference to the following examples and Tables. Below, each inventive example is referred to by a letter "E" and number (e.g., E1, E2 and so on), while the comparative examples are referred to by a letter "C" and a number (e.g., C1, C2 and so on). The examples demonstrate embodiments of the present invention and are by no means meant to be limiting of the invention.

Inventive Example 1

An inventive example, E1, of polypropylene used to make the fibers and fabrics, was prepared using a catalyst system comprising a metallocene on a silica support, either non-fluorided silica ("non-F") or fluorided ("F"), and an NCA activator, such as described in U.S. Pat. No. 6,143,686. The catalyst system was prepared as generally described: rac-dimethylsilanedyl-bis(2-methyl-4-phenylindenyl)zirconium dimethyl and was combined with trisperfluorophenylboron in toluene (Albemarle Corporation, Baton Rouge, La.) and N,N-diethyl aniline. Separately, silica, either fluorided or non-fluorided, was added. The fluorided silica is described in WO 00/12565. A toluene solution of Kemamide™ AS 990 (8 g of AS 990 in 80 g toluene, C. K. Witco Corporation, Greenwich, Conn.) was added to the slurry before drying. Analysis typically shows a loading of 10 wt % Al, 0.20 wt % Zr and an Al/Zr molar ratio of 175.

Several batches of the catalyst system were combined to provide sufficient charge for the polymerization runs. The catalyst system was oil slurried (20 parts by weight catalyst to 80 parts by weight Drakeol™ mineral oil (Penreco, Dickinson Tex.) for ease of addition to the reactor.

The inventive polymer examples were polymerized as follows in a two reactor system. The polymerization was conducted in a pilot scale continuous stirred tank, bulk liquid phase polymerization process employing two reactors in series. The reactors were equipped with jackets for removing the heat of polymerization. The reactor temperature was set at about 50 to 75° C., with 5 to 10° C. difference between the reactors. Catalyst was fed at a rate of about 5 to 7 g/hr. A 2 wt % solution of triethylaluminum (TEAL) in hexane was employed as a scavenger and added at a level of 15 mppm. Propylene was fed at a rate of about 85 to 95 kg/hr.

Preparation of Fluorided Silica. Generally, 20–70 grams of SiO$_2$ (Grace Davison, a subsidiary of W. R. Grace Co., Conn.) as Sylopol®952 ("952 silica gel") having a N$_2$ pore volume 1.63 cc/g and a surface area of 312 m$^2$/g, was dry mixed with 0.5 to 3 grams of ammonium hexafluorosilicate (Aldrich Chemical Company, Milwaukee Wis.). The ammonium hexafluorosilicate added corresponds to 1.05 millimole F per gram silica gel. The mixture was transferred to a 5 cm ID by 50 cm vycor glass tube having a medium frit plug 3.8 cm from one end. The tube was inserted into a tube furnace and flow of N$_2$ (220 cc/min) was passed up through the frit to fluidize the silica bed. The furnace was heated according to the following schedule:

Raise the temperature from 25 to 150° C. over 5 hours
Hold the temperature at 150° C. for 4 hours
Raise the temperature from 150 to 500° C. over 2 hours
Hold the temperature at 500° C. for 4 hours
Heat off and allow to cool under N$_2$
When cool, the fluorided silica was stored under N$_2$.

Comparative Metallocene Resin Example 1

Comparative metallocene examples (C1) of polypropylene was prepared using a metallocene on a silica support. The catalyst system included silica supported rac-dimethylsilanedyl-bis(2-methylindenyl)zirconium dichloride prepared generally as follows: the metallocene was combined with methylalumoxane solution in toluene (Albemarle Corporation, Baton Rouge, La.); added to this mixture was MS 948 silica (25 μm average particle size; 1.6 mL/g pore volume (Davison Chemical division of W. R. Grace, Baltimore, Md.) previously dehydrated. A toluene solution of Kemamide™ AS 990 (8 g of AS 990 in 80 g toluene, C. K. Witco Corporation, Greenwich, Conn.) was added to the slurry before drying.

Several batches of the catalyst system were combined to provide sufficient charge for the polymerization runs. The catalyst system was oil slurried (20 parts by weight catalyst to 80 parts by weight Drakeol™ mineral oil (Penreco, Dickinson Tex.) for ease of addition to the reactor.

Comparative Example 1

(C1) was polymerized as follows in a two reactor system. The polymerization was conducted in a plant scale continuous stirred tank, bulk liquid phase polymerization process employing two reactors in series. The reactors were equipped with jackets for removing the heat of polymerization. The reactor temperature was set at about 50 to 75° C. with about a 10° C. difference between the reactors. A 2 wt % solution of triethylaluminum (TEAL) in hexane was employed as a scavenger and added at a level of 15 mppm. The resin was produced at a rate of 50 to 100 lbs/hr.

Comparative Resin Example 2

This (C2) is a Ziegler-Natta catalyzed polypropylene PP 3746G, obtained from ExxonMobil Chemical Company (Houston, Tex.).

Comparative Resin Example 3

This (C4) are Ziegler-Natta catalyzed polypropylene PP 3546G, obtained from ExxonMobil Chemical Company (Houston, Tex.).

The data in Table 1 reflects the high isotactic nature of the inventive resins. The data in Table 2 reflects the advantages in using the polymers of the invention when compared to either Ziegler-Natta (ZN) catalyzed polypropylene, or to comparative metallocene catalyzed polypropylene. The crystallization half-times of the inventive resins are improved over the comparative metallocene (C1) at the MFR shown in the Table 2. Further, the crystallization temperature (Tc) is higher for the inventive resin than for the comparative metallocene, which is an indication that the inventive resins will crystallize at a higher temperature during processing, which is advantageous. Finally, the second melt temperature (2d Tm) of the inventive resins is improved over the comparative metallocene resins, indicating the higher isotactic nature of the inventive resins.

The higher tacticity (greater MRL) of the inventive polymer results in shorter half-times of crystallization under quiescent conditions. The inherently faster crystallization rate is believed to shorten crystallization times during melt-blown processing, leading to reduced shot. In one embodiment, the crystallization half time for the resins of the invention are from 2.5 to 6.5 min, and from 2.8 to 5 in another embodiment, and from 3 to 4.5 min in yet another embodiment at 125° C. The data in Tables 3–5 reflect the advantages in the inventive fibers and fabrics of the invention. As shot is disadvantageous in a fabric, it can be seen in general that the inventive fabrics have reduced shot compared to comparative metallocene (C1) and ZN catalyzed fabric. In particular, it is typical for shot to increase (shot rating increase) as either the MFR of the resin decreases, and/or the throughput of the resin to form the fibers increases, as is the case in going from Table 3 to Table 5. The inventive fibers and fabrics are improved under most all conditions over the comparative fibers and fabrics.

For example, at a die temperature of from 390 to 450° F. (200 to 232° C.), the shot is improved (lower) for the inventive fabric at 0.4 ghm, 8 inch DCD for the nominal 1600 MFR resins as indicated in Table 3, but the hydrohead (HH), which is a measure of the fabric barrier qualities, is higher, which is advantageous. At the nominal 2600 MFR resin, these same qualities are overall improved for the inventive example over the comparative examples.

Table 4 data, which reflects a higher throughput relative to the conditions in Table 3, still show the advantages of the inventive fibers and fabric over the comparative examples. For example, for the nominal 1600 MFR samples, the inventive fabric shows improved hydrohead and shot over the comparative, a trend which holds true for the nominal 2600 MFR samples. Although shot tends to increase at higher throughput, the inventive samples are improved nonetheless when compared to the comparative examples.

Finally, the Table 5 data at 0.8 ghm and 8 inch DCD shown the advantages of the inventive fibers and fabric. While shot has increased overall as seen by the increase in the shot rating, the inventive fibers and fabrics (E1) are improved when compared to the comparative metallocene catalyzed fibers and fabrics at the same MFR.

The fibers and fabrics of the present invention have improved shot properties. In one embodiment, a fabric formed from the fiber has a shot rating of from 0.5 to 1.5 at 0.4 ghm, 8 inch DCD, and a MFR of from 1200 to 3000. In another embodiment, a fabric formed from the fiber has a shot rating of from 0.5 to 4 at 0.8 ghm, 8 inch DCD, and a MFR of from 1200 to 3000. The hydrohead of the inventive fabric also either improved, or was maintained. In one embodiment, the inventive fabric has a hydrohead value of from greater than 20 inches in one embodiment, and 20 to 26 inches in another embodiment at 0.4 ghm, 8 inch DCD, and a MFR of from 1200 to 3000 for a 25 gsm fabric formed from the fiber on the Accurate Products line at TANDEC. In another embodiment, a fabric formed from the fiber has a hydrohead value of from greater than 15 inches in one embodiment, and from 15–30 inches in another embodiment at 0.8 ghm, 8 inch DCD, and an MFR of from 1200 to 3000 for a 25 gsm fabric formed from the fiber on the Accurate Products line at TANDEC.

Fibers and Fabrics made from the new catalyst system of the invention have improved properties over the comparative examples. In particular, the polypropylene made using the bridged 2,4 di-substituted metallocenes the 4-phenyl indenyl substituted indenyl metallocenes and NCA activators in general, will produce polypropylene having improved crystallization half times over comparative metallocene catalyst systems, while producing polypropylene having an MFR in the range from 100 to 5000 dg/min in one embodiment. The polypropylene is an improvement over Ziegler-Natta catalyzed product in that the polypropylene is reactor grade, thus no peroxides have been added. The crystallization temperature (Tc) of the resins used in the present invention range from 111 to 116° C. in one embodiment, and from 112 to 115° C. in another embodiment. The second melt temperature (2d Tm) of the resin is in the range from 148 to 156° C. in one embodiment, and from 150 to 154° C. in another embodiment, with fewer than 50 stereodefects per 10,000 units in the polypropylene of the fibers and fabrics. The meso run length of these polypropylenes is typically greater than 75. The metallocene can be supported, or unsupported.

The fibers made from the polypropylene are useful in making improved fabrics having a low level of shot, while maintaining or improving hydrohead. The fibers can be used in meltblown fabrics. The crystallization rates of the invention fabrics are more rapid when compared to the comparative examples. Faster crystallization rates are believed to lead to reduced shot.

One of the properties of meltblown webs used in absorbent products are their barrier properties as typically measured by hydrostatic resistance. The meltblown webs made from comparative metallocenes have lower air permeability than webs made from conventional peroxide-treated materials of comparable MFR. This is an indication of good fabric uniformity and small pore size. However, metallocenes used in the prior art have higher shot levels, which reduces the barrier properties of the fabric. The use of the bridged 4-phenyl indenyl metallocenes unexpectedly lowers the shot level as compared to prior art metallocene catalysts. This results in improved hydrohead and barrier properties. There is improvement over the ZN catalyzed resins in eliminating the need for peroxides. Furthermore, the new metallocenes produce equivalent or improved hydrohead than the ZN resins, with equivalent or better shot.

Also, the high MFR polypropylenes from these metallocenes allows the material to be processed at temperatures as much as 35° C. below the optimum for lower MFR Ziegler-Natta catalyzed materials. The combination of the high MFR and the rapid crystallization rates produces fibers that make soft, uniform webs of fabric with very low levels of shot. The inventive metallocene allows the production of higher MFR products in the reactor than is possible with un-treated ZN products without the need for peroxide treatment, which is undesirable because it produces low molecular weight species. This allows processing at lower temperatures, which leads to longer die-tip life, reduced energy costs, and the higher MFR achievable in the present invention lead to better barrier properties and better filtration efficiency.

ARTICLES

Embodiments of the fibers of the invention have a variety of uses alone or in the form of a fabric. These fabrics can be used in a number of applications. One application is to make a laminate (or "composite") from meltblown fabric ("M") and spunbond fabric ("S"), which combines the advantages of strength from spunbonded fabric and greater barrier properties of the meltblown fabric. A typical laminate or composite has three or more layers, a meltblown layer(s) sandwiched between two or more spunbonded layers, or SMS fabric composites. Examples of other combinations are SSMMSS, SMMS, and SMMSS composites. Composites can also be made of the meltblown fabrics of the invention with other materials, either synthetic or natural, to produce useful articles. The fabrics, either single or multiple layered, may be used for a variety of applications such as in apparels, protective wear, absorptive articles, and air and liquid filtration devices.

Apparel articles can be made from the meltblown polypropylene fabric of the invention. In particular, surgical apparel that must protect medical personnel from fluid-borne pathogens, and protect patients from those same pathogens, is useful. The nonwoven fabrics and laminates of the invention can be used in surgical drapes of all sizes, caps, gowns, shoe protectors, face masks, and other garments.

The polypropylene fibers can also be used to make components of disposable diapers and feminine care products. Diaper components such as leg cuffs are examples of components. The fabric and laminate of the invention is useful in any application where a liquid barrier is desired that is lightweight, while maintaining good abrasion resistance. Further, the articles, especially garment articles, of the present invention are typically disposable.

The fabrics of the present invention are also useful as air or liquid filters. Examples of filter applications include automotive and vehicle cabin filters, home ventilation filters, clean room filters, industrial ash and particulates filters, surgical and nuisance dust masks, beverage filters, pharmaceutical filters, medical filters, water purification filters, and recreational filters such as pool filters. The filters may be useful in either sheet or cartridge form, and may be multi-layered or multi-density.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

$^{13}$C NMR data of polypropylene produced from metallocene catalyzed polymerization of propylene of the invention and comparative metallocene catalyzed polymerization of propylene.

| Example | MFR (dg/min) | Stereo | Regio | Total | MRL* |
|---|---|---|---|---|---|
| C1 | 700 | 110 | 33 | 143 | 70 |
| C1 | 700 | 128 | 36 | 164 | 61 |
| E1-non F | 507 | 23 | 79 | 102 | 98 |
| E1-non F | 507 | 16 | 88 | 104 | 96 |
| E1-F | 1500 | 28 | 66 | 94 | 110 |

*Meso run length

TABLE 2

Resin Characteristics

| Resin | | | | Crystallization Half-Times (min) | |
|---|---|---|---|---|---|
| Resin | Catalyst | MFR (dg/min) | Tc (° C.) | 2d Tm (° C.) | @ 125° C. | @ 128° C. |
| C3 | ZN | 1200* | — | — | — | — |
| C3 | ZN | 1483 | 115.9 | 158.8 | 2.2 | 3.9 |
| E1-F | MC | 1582 | 113.3 | 152.9 | 3.5 | 7.1 |
| E1-F | MC | 1822 | 114.6 | 153.3 | 3.1 | 6.0 |
| E1-F | MC | 2447 | 114.3 | 152.6 | 3.3 | 6.4 |
| C1 | MC | 1586 | 110.7 | 148.3 | 6.6 | 13.6 |
| C1 | MC | 2232 | 110.7 | 147.6 | 8.2 | 17.8 |
| C1 | MC | 2609 | 110.9 | 147.8 | 8.0 | 17.8 |

*Approximate

TABLE 3

Fiber and Fabric Characteristics at 0.4 ghm; 8 inch DCD

| Resin | B.W. Gsm[1] | Resin MFR (dg/min)[4] | Die Temp ° F. (° C.) | Air Pres[2] psi | HH inch | Air Perm ft³/ft²/min | Shot Rating |
|---|---|---|---|---|---|---|---|
| 1600 nominal MFR samples | | | | | | | |
| C3 | 26.3 | 1200 | 450 (232) | 8 | 18.5 | 85 | MH[3] |
| E1-F | 26.6 | 1650 | 450 (232) | 5 | 24.1 | 63 | 1 |
| E1-F | 24.4 | 1650 | 420 (215) | 9 | 23.8 | 85 | 1 |
| C1 | 25.9 | 1600 | 420 (215) | 6 | 20.1 | 66 | 3 |
| C2 | 25.2 | 1500 | 420 (215) | 12 | 24.2 | 79 | 2 |
| E1-F | 24.4 | 1820 | 420 (215) | 8 | 26.0 | 78 | 1 |
| E1-F | 25.3 | 1820 | 390 (200) | 12 | 24.3 | 89 | 1 |
| 2600 nominal MFR samples | | | | | | | |
| C1 | 26.9 | 2600 | 390 (200) | 3 | 12.5 | 114 | 1 |
| E1-F | 26.0 | 2450 | 390 (200) | 9 | 26.6 | 66 | 1 |
| E1-F | 26.6 | 2450 | 420 (215) | 4 | 20.9 | 82 | 1 |
| C1 | 23.7 | 2200 | 420 (215) | 2 | 15.8 | 119 | 1 |

[1]Basis Weight of the fabric in grams/m²
[2]Air pressure in pounds per square inch.

TABLE 3-continued

Fiber and Fabric Characteristics at 0.4 ghm; 8 inch DCD

| Resin | B.W. Gsm[1] | Resin MFR (dg/min)[4] | Die Temp ° F. (° C.) | Air Pres[2] psi | HH inch | Air Perm ft³/ft²/min | Shot Rating |
|---|---|---|---|---|---|---|---|

[3]Moderately High, approximately a value of 4.
[4]These values are nominal values based on Table 2 values.

TABLE 4

Fiber and Fabric Characteristics at 0.8 ghm; 10 inch DCD

| Resin | B.W. Gsm[1] | Resin MFR (dg/min) | Die Temp ° F. (° C.) | Air Pres[2] psi | HH inch | Air Perm ft³/ft²/min | Shot Rating |
|---|---|---|---|---|---|---|---|
| 1600 nominal MFR samples | | | | | | | |
| C1 | 25.6 | 1600 | 420 (215) | 9 | 14.7 | 108 | 3 |
| E1-F | 24.9 | 1650 | 420 (215) | 12 | 17.8 | 120 | 1 |
| E1-F | 25.5 | 1820 | 420 (215) | 9 | 18.5 | 112 | 2 |
| C2 | 26.3 | 1500 | 450 (232) | 10 | 16.3 | 103 | 3 |
| 2600 nominal MFR samples | | | | | | | |
| C1 | 26.3 | 2600 | 390 (200) | 6 | 17.4 | 111 | 3 |
| E1-F | 25.6 | 2450 | 390 (200) | 12 | 21.3 | 100 | 1 |

[1]Basis Weight of the fabric in grams/m²
[2]Air pressure in pounds per square inch.

TABLE 5

Fiber and Fabric Characteristics at 0.8 ghm; 8 inch DCD

| Resin | B.W. Gsm[1] | Resin MFR (dg/min) | Die Temp ° F. (° C.) | Air Pres[2] psi | HH inch | Air Perm ft³/ft²/min | Shot Rating |
|---|---|---|---|---|---|---|---|
| 1600 nominal MFR samples | | | | | | | |
| C3 | 26.2 | 1200 | 450 (232) | 12 | 15.7 | 81 | 5 |
| C1 | 25.4 | 1600 | 420 (215) | 9 | 15.9 | 79 | 5 |
| E1-F | 25.6 | 1650 | 420 (215) | 12 | 20.3 | 80 | 3 |
| E1-F | 25.3 | 1820 | 420 (215) | 9 | 18.1 | 95 | 4 |
| C2 | 25.5 | 1500 | 420 (215) | 12 | 17.5 | 105 | 2.5 |
| 2600 nominal MFR samples | | | | | | | |
| C1 | 26.2 | 2600 | 390 (232) | 6 | 21.6 | 94 | 4 |
| E1-F | 26.3 | 2450 | 390 (232) | 12 | 23.6 | 67 | 2 |

[1]Basis Weight of the fabric in grams/m²
[2]Air pressure in pounds per square inch.

I claim:

1. A fiber comprising reactor grade polypropylene having a crystallization half time of from 2.5 to 5 min and having less than 50 stereo defects per 1000 units.

2. The fiber of claim 1, wherein the polypropylene is produced from a catalyst system comprising at least one bridged 2,4 di-substituted indenyl metallocene.

3. The fiber of claim 2, wherein the catalyst system also comprises at least one activator selected from trisperfluorophenylboron, tris(3,5-di(trifluoromethyl)phenyl)boron, tris(di-t-butylmethylsilyl)perfluorophenylboron, triethylammonium tetraphenylborate; tripropylammonium tetraphenylborate; tri(n-butyl)ammonium tetraphenylborate; trimethylammonium tetrakis(p-tolyl)borate; trimethylammonium tetrakis(o-tolyl)borate; tributylammonium tetrakis(pentafluorophenyl)borate; tripropylammonium tetrakis(o,p-dimethylphenyl)borate; tributylammonium tetrakis(m,m-dimethylphenyl)borate; tributylammonium tetrakis(p-trifluoromethylphenyl)borate; tributylammonium tetrakis(pentafluorophenyl)borate;
   tri(n-butyl)ammonium tetrakis(o-tolyl)borate; N,N-dimethylanilinium tetrakis(pentafluorophenyl)borate;
   N,N-dimethylaniliniumtetrakis(heptafluoronaphthyl)borate;
   N,N-dimethylanilinium tetrakis(perfluoro-4-biphenyl)borate;
   N,N-dimethylanilinium tetraphenylborate;
   N,N-diethylanilinium tetraphenylborate;
   N,N-2,4,6-pentamethylanilinium tetraphenylborate, and other highly fluorinated trisarylboron compounds and their ionic analogs.

4. The fiber of claim 3, wherein the catalyst system also comprises a fluorided silica support.

5. The fiber of claim 1, wherein the melt flow rate of the polypropylene is greater than 1000 dg/min.

6. The fiber of claim 1, wherein the melt flow rate of the polypropylene is from 500 dg/min to 3000 dg/min.

7. The fiber of claim 1, wherein the polypropylene has a MWD in the range from 2 to 4.

8. The fiber of claim 1, wherein the polypropylene is a homopolymer.

9. The fiber of claim 1, wherein the fiber is meltblown.

10. A meltblown fiber comprising reactor grade propylene homopolymer having a melt flow rate of from 100 dg/min to 5000 dg/min and having less than 50 stereo defects per 1000 units, the polypropylene produced from a catalyst system comprising at least one metallocene catalyst.

11. The fiber of claim 10, wherein the at least one metallocene catalyst is a bridged 2,4 di-substituted metallocene.

12. The fiber of claim 10, wherein the melt flow rate of the polypropylene is greater than 1000 dg/min.

13. The fiber of claim 10, wherein the melt flow rate of the polypropylene is from 500 dg/min to 3000 dg/min.

14. The fiber of claim 10, wherein the polypropylene has a MWD in the range from 2 to 4.

15. The fiber of claim 10, wherein the catalyst system also comprises at least one activator selected from trisperfluorophenylboron, tris(3,5-di(trifluoromethyl)phenyl)boron, tris(di-t-butylmethylsilyl)perfluorophenylboron, triethylammonium tetraphenylborate; tripropylammonium tetraphenylborate; tri(n-butyl)ammonium tetraphenylborate; trimethylammonium tetrakis(p-tolyl)borate; trimethylammonium tetrakis(o-tolyl)borate; tributylammonium tetrakis(pentafluorophenyl)borate; tripropylammonium tetrakis(o,p-dimethylphenyl)borate; tributylammonium tetrakis(m,m-dimethylphenyl)borate; tributylammonium tetrakis(p-trifluoromethylphenyl)borate; tributylammonium tetrakis(pentafluorophenyl)borate;
   tri(n-butyl)ammonium tetrakis(o-tolyl)borate; N,N-dimethylanilinium tetrakis(pentafluorophenyl)borate;
   N,N-dimethylaniliniumtetrakis(heptafluoronaphthyl)borate;
   N,N-dimethylanilinium tetrakis(perfluoro-4-biphenyl)borate;
   N,N-dimethylanilinium tetraphenylborate;
   N,N-diethylanilinium tetraphenylborate;
   N,N-2,4,6-pentamethylanilinium tetraphenylborate, and other highly fluorinated trisarylboron compounds and their ionic analogs.

16. The fiber of claim 10, wherein the catalyst system comprises a support component, the support component being fluorided silica.

17. A fabric produced from a polypropylene fiber, the polypropylene being reactor grade and having a melt flow rate of from 100 dg/min to 5000 dg/min and having less than 50 stereo defects per 1000 units.

18. The fabric of claim 17, wherein the melt flow rate of the polypropylene is greater than 1000 dg/min.

19. The fabric of claim 17, wherein the melt flow rate of the polypropylene is from 500 dg/min to 3000 dg/min.

20. The fabric of claim 17, wherein the polypropylene has a MWD in the range from 2 to 4.

21. The fabric of claim 17, wherein the polypropylene is produced from a catalyst system comprising a bridged 2,4 di-substituted indenyl metallocene.

22. The fabric of claim 17, wherein the polypropylene is produced from a catalyst system comprising a bridged 4-phenyl indenyl metallocene.

23. The fabric of claim 17, wherein the fabric is formed by a meltblown process.

24. The fabric of claim 17, wherein the catalyst system also comprises at least one activator selected from trisperfluorophenylboron, tris(3,5-di(trifluoromethyl)phenyl)boron, tris(di-t-butylmethylsilyl)perfluorophenylboron, triethylammonium tetraphenylborate; tripropylammonium tetraphenylborate; tri(n-butyl)ammonium tetraphenylborate; trimethylammonium tetrakis(p-tolyl)borate; trimethylammonium tetrakis(o-tolyl)borate; tributylammonium tetrakis(pentafluorophenyl)borate; tripropylammonium tetrakis(o,p-dimethylphenyl)borate; tributylammonium tetrakis(m,m-dimethylphenyl)borate; tributylammonium tetrakis(p-trifluoromethylphenyl)borate; tributylammonium tetrakis(pentafluorophenyl)borate;

- tri(n-butyl)ammonium tetrakis(o-tolyl)borate; N,N-dimethylanilinium tetrakis(pentafluorophenyl)borate;
- N,N-dimethylaniliniumtetrakis(heptafluoronaphthyl)borate;
- N,N-dimethylanilinium tetrakis(perfluoro-4-biphenyl)borate;
- N,N-dimethylanilinium tetraphenylborate;
- N,N-diethylanilinium tetraphenylborate;
- N,N-2,4,6-pentamethylanilinium tetraphenylborate, and other highly fluorinated trisarylboron compounds and their ionic analogs.

25. The fabric of claim 17, wherein the catalyst system also comprises a silica support.

26. The fabric of claim 17, wherein the polypropylene is a homopolymer.

27. The fabric of claim 17, wherein the fabric has a shot rating of from 0.5 to 1.5 at 0.4 ghm, 8 inch DCD, and a MFR of from 1200 to 3000.

28. The fabric of claim 17, wherein the fabric has a shot rating of from 0.5 to 4 at 0.8 ghm, 8 inch DCD, and a MFR of from 1200 to 3000.

29. The fabric of claim 17, wherein the fabric has a hydrohead value of from greater than 20 inches at 0.4 ghm, 8 inch DCD, and a MFR of from 1200 to 3000.

30. The fabric of claim 17, wherein the fabric has a hydrohead value of from greater than 15 inches at 0.8 ghm, 8 inch DCD, and an MFR of from 1200 to 3000.

31. The fabric of claim 17, wherein a nucleating agent is added to the polypropylene prior to forming the fiber.

32. A fabric manufactured from a meltblown fiber comprising reactor grade propylene homopolymer having a melt flow rate of from 100 dg/min to 5000 dg/min and having less than 50 stereo defects per 1000 units, the polypropylene produced from a catalyst system comprising at least one metallocene catalyst.

33. The fabric of claim 32, wherein the melt flow rate of the polypropylene is greater than 1000 dg/min.

34. The fabric of claim 32, wherein the melt flow rate of the polypropylene is from 500 dg/min to 3000 dg/min.

35. The fabric of claim 32, wherein the polypropylene has a MWD in the range from 2 to 4.

36. The fabric of claim 32, wherein the catalyst system also comprises at least one activator selected from trisperfluorophenylboron, tris(3,5-di(trifluoromethyl)phenyl)boron, tris(di-t-butylmethylsilyl)perfluorophenylboron, triethylammonium tetraphenylborate; tripropylammonium tetraphenylborate; tri(n-butyl)ammonium tetraphenylborate; trimethylammonium tetrakis(p-tolyl)borate; trimethylammonium tetrakis(o-tolyl)borate; tributylammonium tetrakis(pentafluorophenyl)borate; tripropylammonium tetrakis(o,p-dimethylphenyl)borate; tributylammonium tetrakis(m,m-dimethylphenyl)borate; tributylammonium tetrakis(p-trifluoromethylphenyl)borate; tributylammonium tetrakis(pentafluorophenyl)borate;

- tri(n-butyl)ammonium tetrakis(o-tolyl)borate; N,N-dimethylanilinium tetrakis(pentafluorophenyl)borate;
- N,N-dimethylaniliniumtetrakis(heptafluoronaphthyl)borate;
- N,N-dimethylanilinium tetrakis(perfluoro-4-biphenyl)borate;
- N,N-dimethylanilinium tetraphenylborate;
- N,N-diethylanilinium tetraphenylborate;
- N,N-2,4,6-pentamethylanilinium tetraphenylborate. and other highly fluorinated trisarylboron compounds and their ionic analogs.

37. The fabric of claim 32, wherein the catalyst system also includes a support component, the support being fluorided silica.

38. The fabric of claim 32, wherein the fabric has a shot rating of from 0.5 to 1.5 at 0.4 ghm, 8 inch DCD, and a MFR of from 1200 to 3000.

39. The fabric of claim 32, wherein the fabric has a shot rating of from 0.5 to 4 at 0.8 ghm, 8 inch DCD, and a MFR of from 1200 to 3000.

40. The fabric of claim 32, wherein the fabric has a hydrohead value of from greater than 20 inches at 0.4 ghm, 8 inch DCD, and a MFR of from 1200 to 3000.

41. The fabric of claim 32, wherein the fabric has a hydrohead value of from greater than 15 inches at 0.8 ghm, 8 inch DCD, and an MFR of from 1200 to 3000.

42. The fabric of claim 32, wherein the metallocene is a bridged 2,4 di-substituted indenyl metallocene.

* * * * *